United States Patent [19]

Nagano et al.

[11] Patent Number: 5,260,825
[45] Date of Patent: Nov. 9, 1993

[54] MICROSCOPE

[75] Inventors: Takashi Nagano; Jitsunari Kojima, both of Hachiouji, Japan

[73] Assignee: Olympus Optical Co., Ltd., Tokyo, Japan

[21] Appl. No.: 742,517

[22] Filed: Aug. 6, 1991

Related U.S. Application Data

[63] Continuation of Ser. No. 495,906, Mar. 20, 1990, abandoned.

[30] Foreign Application Priority Data

Mar. 20, 1989 [JP] Japan .................................. 1-68273

[51] Int. Cl.⁵ ........................ G02B 21/00; G01J 1/20
[52] U.S. Cl. .................................. 359/368; 359/383; 250/201.3
[58] Field of Search .................. 350/502, 507–528, 350/427, 430; 250/201, 205, 201.1–201.8; 359/362–390, 432

[56] References Cited

U.S. PATENT DOCUMENTS

| | | | |
|---|---|---|---|
| 2,553,108 | 5/1951 | Osterberg et al. | 359/370 |
| 2,674,157 | 4/1954 | Heine | 359/370 |
| 4,486,078 | 12/1984 | Hashimoto et al. | 350/520 |
| 4,586,794 | 5/1986 | Bierleutges et al. | 350/520 |
| 4,643,540 | 2/1987 | Kawasaki et al. | 350/507 |
| 4,653,878 | 3/1987 | Nakasato et al. | 350/507 |
| 4,661,692 | 4/1987 | Kawasaki | 250/201 |
| 4,725,720 | 2/1988 | Sawada et al. | 250/201.3 |
| 4,810,869 | 3/1989 | Yabe et al. | 250/201.3 |
| 4,854,682 | 8/1989 | Yamanashi | 350/427 |
| 4,861,147 | 8/1989 | Tanaka | 350/427 |
| 4,897,537 | 1/1990 | Miyamoto et al. | 350/507 |
| 4,902,101 | 2/1990 | Fujihara et al. | 359/383 |

FOREIGN PATENT DOCUMENTS 0124241 11/1984 European Pat. Off.
3707487 11/1987 Fed. Rep. of Germany.

Primary Examiner—Bruce Y. Arnold
Assistant Examiner—Thong Nguyen
Attorney, Agent, or Firm—Cushman, Darby & Cushman

[57] ABSTRACT

A microscope has a plural number of objective lenses switchable from one to another, a memory circuit for storing parfocality data for the individual objective lenses, and a correcting device for correcting imaging conditions on the basis of the parfocality data for an objective lens currently used and another objective lens to be selected for microscopy. The microscope is capable of always providing favorably focused condition even when the objective lenses are switched from one to another for changing observation magnification levels.

10 Claims, 5 Drawing Sheets

MICROSCOPE

This is a continuation of application Ser. No. 07/495,906, filed on Mar. 20, 1990, now abandoned.

BACKGROUND OF THE INVENTION

1. Field of the Invention

The present invention relates to a microscope which is equipped with switchable objective lenses.

2. Description of the Prior Art

Microscopes which permit observing magnified images of fine samples and recording such images with photographing cameras, video cameras, etc. are widely utilized for studies and inspections in the industrial, biological and other fields of application. The microscopes which are utilized in these fields are generally equipped with a plural number of objective lenses having magnification levels different from one another and attached to a rotary revolver, which is rotated electrically or manually for switching the objective lenses to be set in an observation optical system. However, it is ordinarily impossible to observe a sample in optimum conditions through the individual objective lenses without changing the illuminated condition of the sample along with the switching of the objective lenses. Further, the conventional microscopes have a common defect that said microscopes require bringing a sample to be observed into focus each time the objective lenses are switched from one to another, thereby obliging microscopists to consume a longer time for operation of the microscopes than that usable for the studies and inspections that they desire.

In order to correct this defect, U.S. Pat. No. 4,661,692, European Patent No. 124,241 and DE 3,707,484 proposed microscopes having improved operability wherein illumination optical systems are automatically exchanged so as to establish an optimum illumination condition along with switching of the objective lenses and samples are brought into focus with automatic focusing mechanisms.

However, the above-mentioned conventional microscopes had another common defect that samples are more or less defocused by the switching operation of the objective lenses due to manufacturing variations or dimensional errors of component parts and said microscopes require refocusing of samples.

SUMMARY OF THE INVENTION

In view of the problems described above, it is a primary object of the present invention to provide a microscope which is capable of always establishing favorably focused condition even after objective lenses attached to a revolver are switched from one to another for changing magnification levels for observation and therefore requires no operation for refocusing.

According to the present invention, this object is attained by equipping a microscope having a plural number of objective lenses to be switched from one to another for microscopy with a memory means for storing parfocality data for the individual objective lenses and a correcting means for correcting imaging condition on the basis of the parfocality data for the objective lens currently used and the objective lens to be selected for microscopy, thereby correcting defocused condition automatically upon switching of the objective lenses.

This and other objects as well as the features and advantages of the present invention will become apparent from the following detailed description of the preferred embodiments when taken in conjunction with the accompanying drawings.

DETAILED DESCRIPTION OF THE PREFERRED EMBODIMENTS

Figure 1:
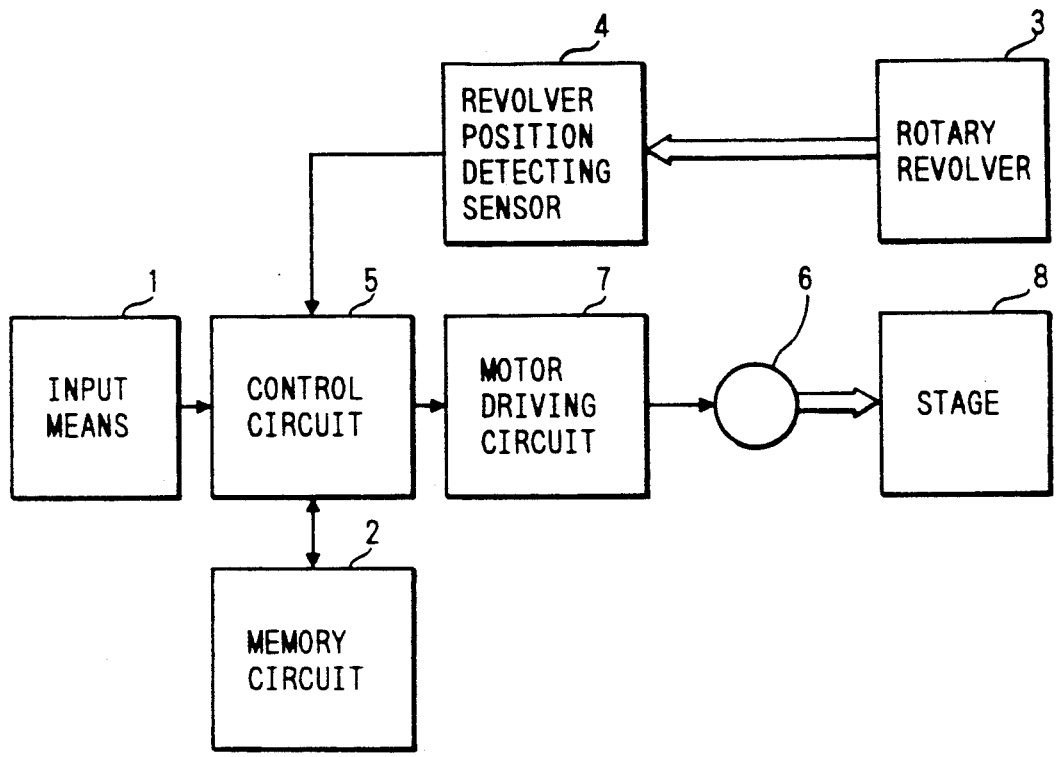
FIG. 1 is a block diagram illustrating an Embodiment 1 of the microscope according to the present invention.
Figure 5:
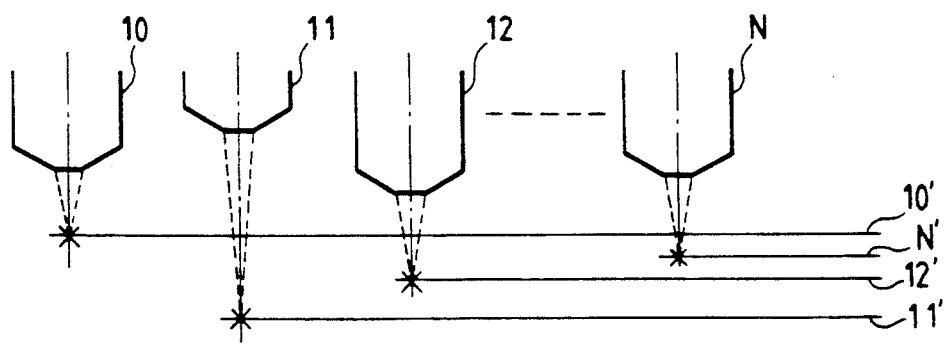
FIG. 5 is a sectional view descriptive of stage positions in focused conditions of the individual objective lenses.
Figure 2:
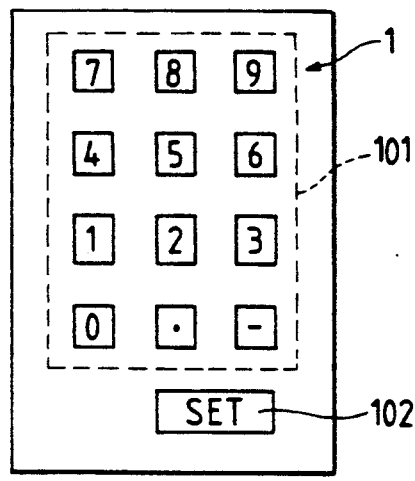
FIG. 2 is a plan view illustrating an example of input means.
Figure 3:
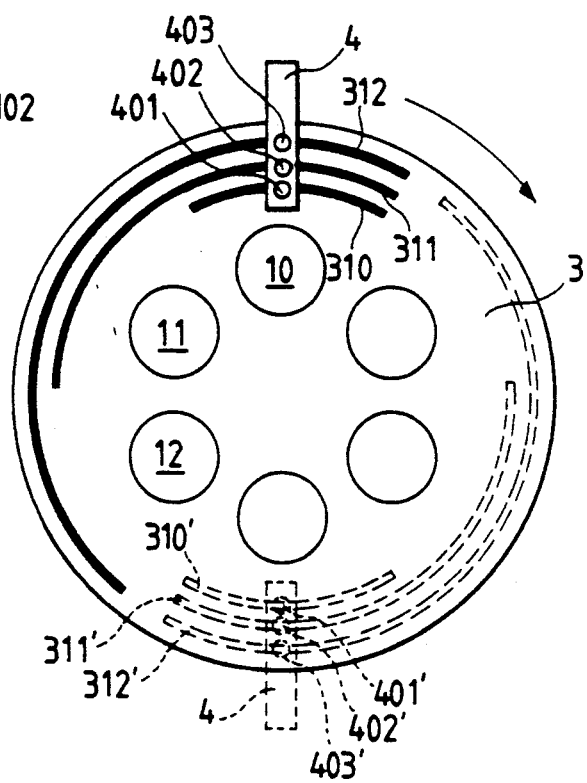
FIG. 3 is a plan view descriptive of an example of coupled condition between a rotary revolver and a revolver position detecting sensor.
Figure 4:
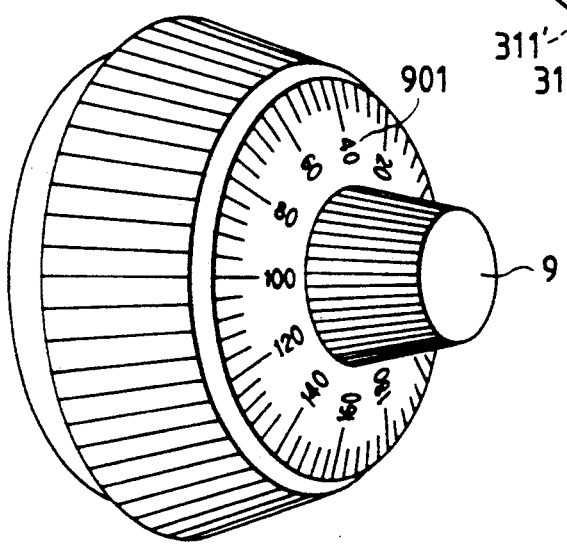
FIG. 4 is a perspective view illustrating an example of focusing knob.
Figure 6:
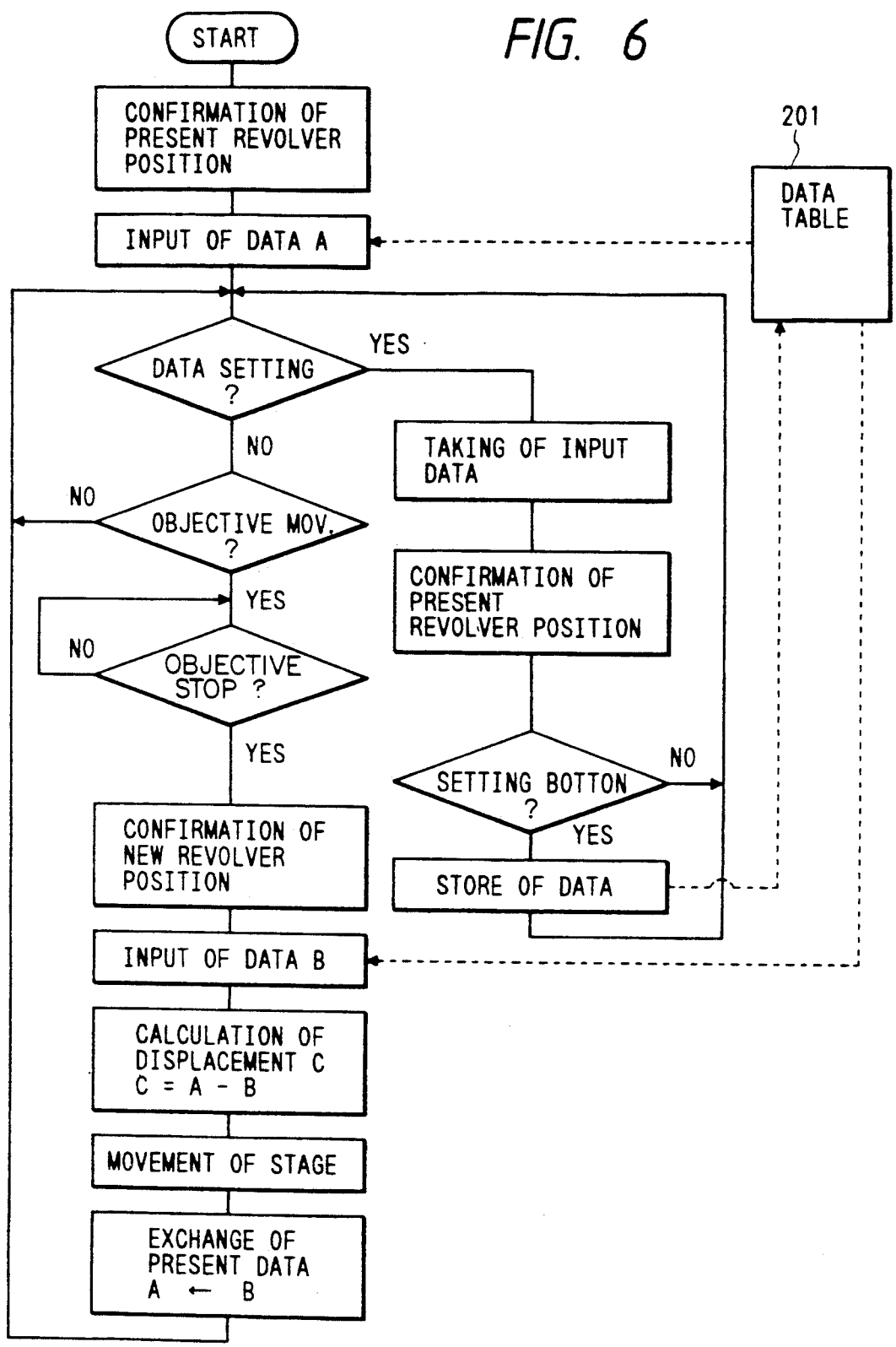
FIG. 6 is a flow chart illustrating operating sequence of the microscope according to the present invention.

Now, the Embodiment of the microscope according to the present invention will be described with reference to FIG. 1 through FIG. 6. FIG. 1 shows a block diagram of a control system applied to a microscope equipped with a sample stage which is to be moved up and down. In this drawing, the reference numeral 1 represents an input means for inputting objective lens data and stage position data. This input means comprises numerical keys 101 and a setting button 102 for data setting as exemplified by FIG. 2. The reference numeral 2 designates a memory circuit for memorizing inputted data which comprises a data table 201 for storing the data (FIG. 6). The reference numeral 3 denotes a rotary revolver, the reference numeral 4 represents a revolver position detecting sensor for detecting which objective lens is set in the observation optical path, the reference numeral 5 designates a control circuit for processing signals emitted from the memory circuit and the revolver position detecting sensor, the reference numeral 6 denotes a motor for moving a sample stage 8 up and down in accordance with signals emitted from the control circuit 5 through a motor driving circuit 7, and the reference numeral 9 represents a known type focusing knob having engraved divisions 901 and to be used for manually moving the sample stage 8 up and down. In the rotary revolver 3, attached or formed, for example, on or in the movable portion thereof are reflecting plates 310, 311, 312, ... in shapes of coaxial arcs or slots 310', 311', 312', ... in shapes of coaxial arcs which are extending over the ranges corresponding to the rotating angles required for bringing objective lenses 10, 11, 12, ... respectively from the standard positions thereof into the optical path. When a plural number of reflection type sensors 401, 402, 403, ... are used as the revolver position detecting sensor 4, a plural number of the arc-shaped reflecting plates 310, 311, 312, ... are arranged at the positions corresponding to these sensors respectively or when a plural number of transmission type sensors 401', 402', 403', ... are used as the revolver position detecting sensor 4, a plural number of the arc-shaped slots 310', 311', 312' are formed at the positions corresponding to the sensors respectively, thereby making the control circuit capable of detecting which objective lens is set in the optical path.

Now, the function of the Embodiment 1 will be explained below.

First, a description will be made of procedures for inputting data. The rotary revolver 3 is generally equipped with four to six objective lenses which have focused positions different from one another due to not only focal lengths of the respective objective lenses but also working precision of the revolver. FIG. 5 schematically shows stage positions 10', 11', 12', ... N' in focused conditions of objective lenses 10, 11, 12, ..., N. It is therefore necessary to record the stage positions corresponding to the focused conditions of the individual objective lenses as data specific thereto into the data table 201. These data are to be inputted in the procedures described below. Now, let us assume that the objective lens 10 is taken as a standard. First, the sample stage 8 is moved by turning the focusing knob 9 until the stage position 10' corresponding to the objective lens 10 is attained. In this case, the moving distance of the sample stage 8 can be read on a graduated dial 901 and a numerical data "0" must be inputted by the input means 1 for setting the position of the sample stage 8 as the origin. This data is inputted by depressing the button "0" out of the numerical keys 101 and then depressing the setting button 102. Upon depressing the setting button 102, the revolver position at that time is recorded into the data table 201 of the memory circuit 2 together with the stage position data ("0" in this case for indicating the standard position) under cooperating functions between the reflecting plates 310, 311, 312, ... and the sensors 401, 402, 403, ... or cooperating functions between the slots 310', 311', 312', ... and the sensors 401', 402', 403', .... Then, the objective lens 11 is brought into the optical path in place of the objective lens 10 by rotating the revolver 3 in the direction indicated by the arrow in FIG. 3 and the sample stage 8 is moved once again by turning the focusing knob 9 until the objective lens 11 is brought into focus. In this case also, the moving distance of the sample stage 8 can be read on the graduated dial 901, and a numerical value representing the moving distance is inputted by using the input means 1 and recorded as stage position data together with the revolver position data at this time into the data table 201 of the memory circuit 2 by depressing the setting button 102. Further, similar procedures are repeated for each of the objective lens 12 and all the rest of the objective lenses attached to the revolver 3 for recording revolver position and stage position data at the focussed condition into the data table 201 to thereby determine parfocal conditions (where each lens is focused) for each lens.

Now the operating procedures for the Embodiment 1 will be described with reference to FIG. 6. When a power source switch (not shown) arranged on the microscope is turned ON, the revolver position corresponding to the objective lens 10, for example, which is set in the optical path is confirmed by the revolver position detecting sensor 4. The control circuit 5 reads out the stage position data corresponding to the confirmed revolver position (hereinafter referred to as data A) from the data table 201 of the memory circuit 2. If the data is inputted by the input means 1 and the setting button 102 is depressed at this step, the revolver position at this time and the inputted data are recorded into the data table 201 as described above. In contrast, when the revolver 3 is rotated without performing the above-described inputting operations and the objective lens 11, for example, is brought into the observation optical path, the new revolver position is confirmed by the revolver position detecting sensor 4 and the control circuit 5 reads out the stage position data corresponding to the newly confirmed revolver position (hereinafter referred to as data B) from the data table 201 of the memory circuit 2. The control circuit 5 calculates a moving distance C for the stage on the basis of the data A and the data B, and outputs the calculation result to the motor driving circuit 7 for correcting a defocused condition by moving the sample stage 8 for by the distance C. Since the data A is held in the control circuit 5 in this condition, the current data A is replaced with the data B to set the control circuit 5 in a state ready for the next revolver rotation or data inputting. A single operating sequence to correct defocused condition caused by switching the objective lenses and by working precision of the revolver is completed in this way. Accordingly, the Embodiment 1 of the present invention provides a microscope which requires no focusing operation after switching the objective lenses from one to another in practice and can assure high operability.

In addition, even when the height to be brought into good focus is varied by exchange of samples, for example, it is sufficient to perform the focusing operation only for any one of the objective lenses attached to the rotary revolver since the Embodiment 1 is so adapted as to read out the differences in height of the sample stage for the individual objective lenses and correct only the differences in height of the sample stage as described above.

Figure 7:
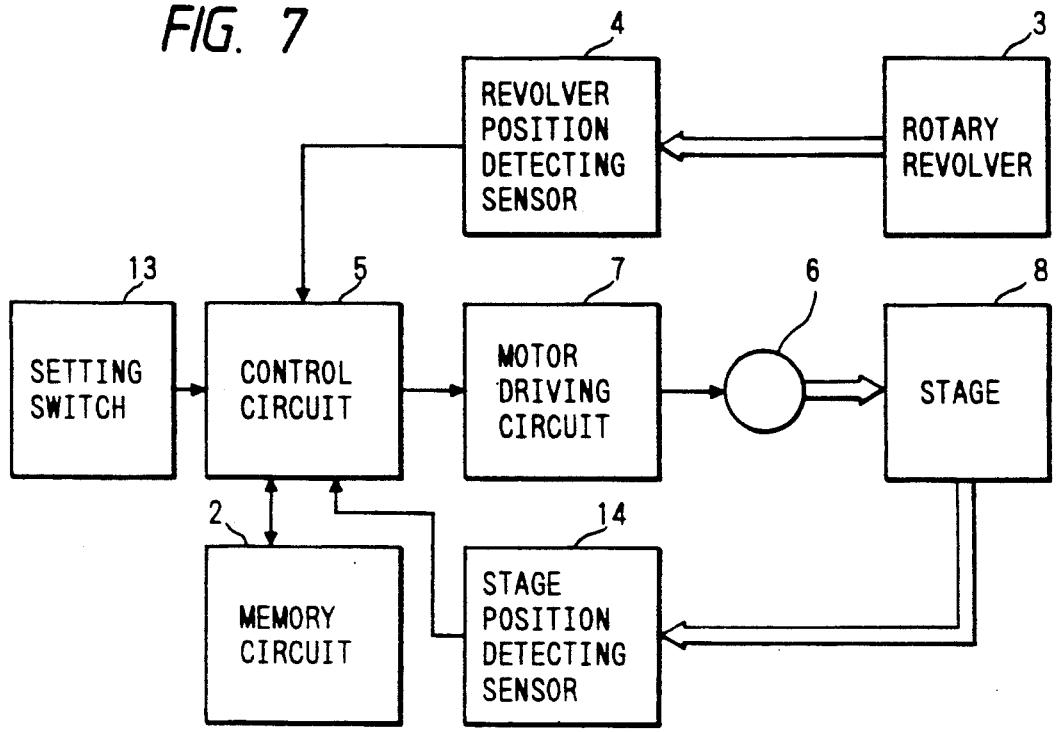
FIG. 7 through FIG. 9 are block diagrams illustrating Embodiments 2 through 4 of the microscope according to the present invention.

FIG. 7 is a block diagram of a control system used in the Embodiment 2 of the present invention. The Embodiment 2 uses the revolver position detecting system and the sample stage driving system which are the same as those in the Embodiment 1, but adopts a stage position detecting sensor 14 arranged at the location corresponding to the sample stage 8 for facilitating input of the objective lens data and the stage position data. More definitely, the Embodiment 2 is designed as a type which eliminates the necessity to set a standard value, or detects the stage positions corresponding to focused conditions of the objective lenses in a form of absolute values. In this case, the stage positions can be detected by reading out the divisions on the graduated scale 901 or rotating angles of the focusing knob 9. As for data inputting procedures for the Embodiment 2, a surface of a sample placed on the stage 8 is brought into focus with one of objective lenses attached to the revolver 3 set in the optical path and a setting switch 13 is depressed for reading and storing the objective lens data at that time and stage position data from the stage position detecting sensor 14 into the control circuit 5 and the memory circuit 2 respectively. Data input can be completed by repeating these procedures for all the objective lenses that are attached to the rotary revolver. Functions of the Embodiment 2 are similar to those of the Embodiment 1. Speaking concretely, when the objective lenses are switched from one to another by rotating the rotary revolver 3, the stage position data provided from the stage position detecting sensor 14 and the stage position data for the newly selected objective lens stored in the memory circuit 2 are read into the control circuit 5 for calculation, a motor rotation degree is determined on the basis of the calculation result, the motor 6 is driven by the motor driving circuit 7 and the sample stage is moved for correcting defocused condition. The Embodiment 2 which is equipped with the stage position sensor 14 always permits confirming current stage position and correcting defocused condition, should the stage 8 be shocked and displaced upward or downward, thereby assuring operability more excellent than that of the Embodiment 1.

Figure 8:
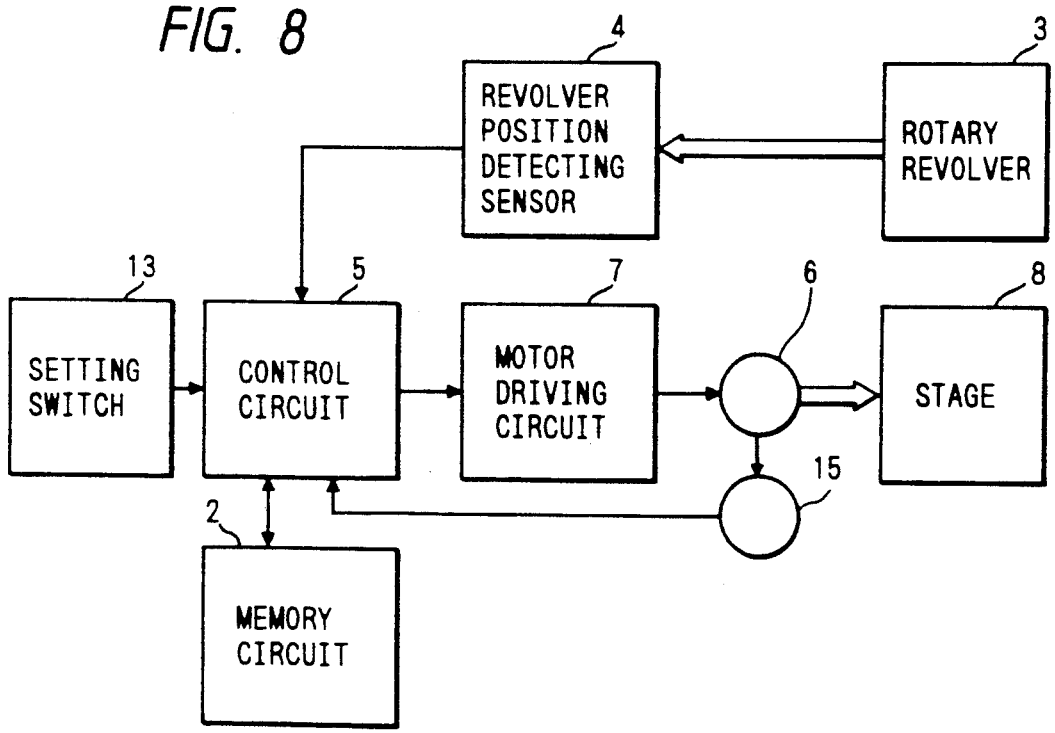

FIG. 8 shows a block diagram of a control system adopted for the Embodiment 3 of the present invention. The Embodiment 3 is so adapted, like the Embodiment 2, as to permit detecting position of the sample stage 8. However, the Embodiment 3 performs the detection of the stage position by using an encoder 15 connected to the motor 6, in place of the stage position detecting sensor 14 adopted in the Embodiment 2, and is so adapted as to store output of the encoder 15 as the stage position data into the memory circuit 2. Accordingly, the Embodiment 3 has functions similar to those of the Embodiment 2. In the Embodiment 3, the control circuit 5 always monitors the stage position data (encoder value) for the objective lens newly set into the observation optical path which is preliminarily stored in the memory circuit 2 and current stage position data fed back from the motor 6 (encoder value), and the stage driving circuit 7 drives the motor 6 so as to move the stage 8 for correcting defocused condition.

Figure 9:
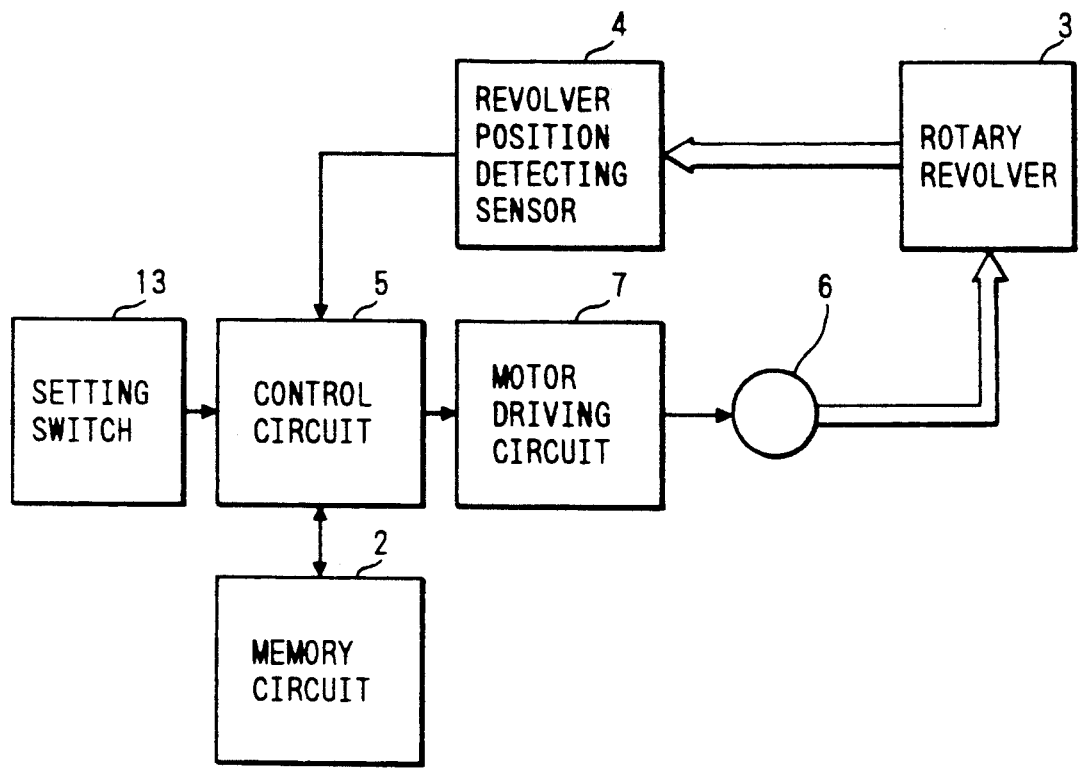

FIG. 9 is a block diagram illustrating a control system selected for the Embodiment 4 of the present invention. The Embodiment 4 is similar to the Embodiment 3 in the principle of operation, functions, effect, etc., but so adapted as to perform the correction of defocused condition by moving the rotary revolver 3 up and down, unlike the Embodiment 3 which performs the correction of defocused condition by moving the sample stage up and down. As for the functions of the Embodiment 4 for correcting defocused condition, the revolver position detecting sensor 4 detects rotating position of the revolver, i.e., data on the objective lens newly set in the observation optical path and current height of the revolver 3, the control circuit 5 compares the height with the revolver height data for the objective lens newly set in the observation optical path which is stored in the memory circuit 2 and determines vertical moving distance for the revolver, and the motor driving circuit 7 drives the motor 6 to move the revolver up or down. Accordingly, the Embodiment 4 is a microscope which requires no focusing operation after rotating the revolver and has high operability.

Figure 10A:
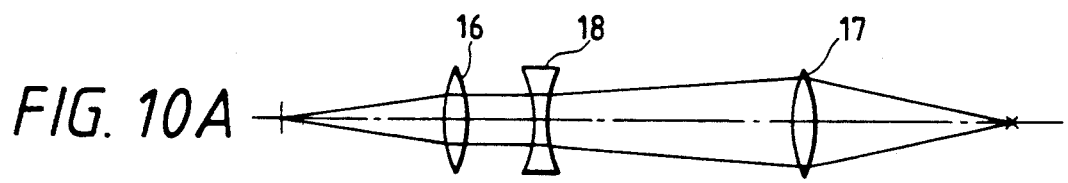
FIG. 10A and FIG. 10B are sectional views descriptive of a lens system used according to Embodiment 5
Figure 10B:
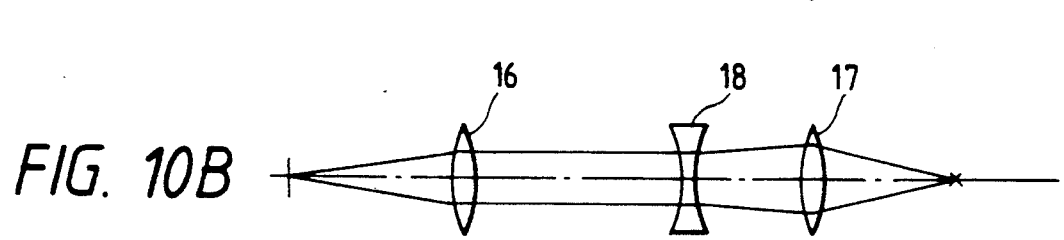

FIGS. 10A-10B illustrate an objective lens system used in the Embodiment 5 of the present invention. Unlike the Embodiments 1 through 4 described above, the Embodiment 5 is equipped, for each of the objective lenses attached to the rotary revolver 3, with a defocus correcting mechanism which is used for correcting defocused condition of each objective lens when it is put into operation by the revolver 3. The objective lens system is composed of a first lens component 17 for allowing incidence of light from a sample, a second lens component 16 for forming the image to be observed. A focusing lens component 18 is arranged for adjusting an image point where the lens observes back and forth. When the focusing lens component 18 is displaced toward the first lens component 16 as shown in FIG. 10A, the imaging point moves further away from the second lens component 17. When the focusing lens component 18 is moved toward the second lens component 17 as shown in FIG. 10B, the imaging point is shifted toward the second lens component 17. By equipping each objective lens with such a mechanism as to adjusting the imaging point as described above, and preliminarily correcting defocused condition of the objective lens, it is possible to separately adjust each objective lens to obtain a microscope which requires no tedious procedures for focusing after changing observation magnification levels by rotating the rotary revolver and has high operability, thereby allowing microscopists to be devoted exclusively to microscopy.

What is claimed is:

1. A multiple lens microscope control system comprising:
   a plural number of objective lenses, switchable from one to another so that any one of said objective lenses is a currently used objective lens;
   a rotary revolver for holding and revolving said plural number of objective lenses;
   a revolver position detecting means cooperating with said rotary revolver for detecting which of the objective lenses is currently being used;
   a stage for holding a sample to be observed through the objective lens currently used on a surface thereof;
   memory means for storing data for each of said objective lenses indicative of a distance for proper focus, said memory means comprising an input device for allowing a user to input stage position data which will correct a defocused position, a control circuit connected to said input device, and a memory circuit connected to said control circuit for storing said data,
   wherein said revolver position detecting means is connected to said control circuit and functions to detect a position of said revolver; and
   a correcting means, connected to said memory means for correcting said data stored in said memory means for the objective lens currently used, said data corrected based on said stage position data, said correcting means comprises a motor driving circuit connected to said control circuit and a motor connected to said motor driving circuit for moving said stage relative to said currently used lens by an amount corresponding to the data in said memory circuit indicative of said distance for proper focus for said currently used objective lens.

2. The multiple lens microscope control system as in claim 1 wherein said correcting means includes means for moving each said objective lens currently used closer or further from an object to be imaged based on said data.

3. A multiple lens microscope control system comprising:
   a plural number of objective lenses, switchable from one to another so that any one of said objective lenses is a currently used objective lens;
   memory means for storing data for each of said objective lenses indicative of a distance for proper focus;
   a correcting means, connected to said memory means for automatically correcting focusing for the objective lens currently used based on said data;
   a rotary revolver for holding said plural number of objective lenses;
   a revolver position detecting means cooperating with said rotary revolver for detecting which of the objective lenses is currently used;

a stage for holding a sample to be observed through the objective lens currently used and a stage position detecting means for detecting a current position of said stage, said memory means comprises a setting switch, a control circuit connected to said setting switch, a memory circuit connected to said control circuit for storing said current position of said stage from said stage position detecting means when said setting switch is actuated, said current position then indicative of a distance for proper focus, said revolver position detecting means connected to said control circuit and said stage position detecting means connected to said control circuit, and said correcting means comprises a motor driving circuit connected to said control circuit, and a motor connected to said motor driving circuit for moving said stage.

4. A multiple lens microscope control system comprising:
- a plural number of objective lenses, switchable from one to another so that any one of said objective lenses is a currently used objective lens;
- memory means for storing data for each of said objective lenses indicative of a distance for proper focus;
- a correcting means, connected to said memory means for automatically correcting focusing for the objective lens currently used based on said data;
- a rotary revolver for holding said plural number of objective lenses;
- a revolver position detecting means cooperating with said rotary revolver for detecting which of the objective lenses is currently used;
- a stage for holding a sample to be observed through the objective lens currently used and a motor connected to said stage and capable of moving said stage,
- said memory means comprises a setting switch, a control circuit connected to said setting switch, a memory circuit connected to said control circuit and storing said data indicative of proper focus when activated by said setting switch and said revolver position detecting means connected to said control circuit, and said correcting means comprises a motor driving circuit connected between said control circuit and said motor for controlling said motor based on an output of said control circuit.

5. A multiple lens microscope control system comprising:
- a plural number of objective lenses, switchable from one to another so that any one of said objective lenses is a currently used objective lens;
- memory means for storing data for each of said objective lenses indicative of a distance for proper focus;
- a correcting means, connected to said memory means for automatically correcting focusing for the objective lens currently used based on said data;
- a rotary revolver for holding said plural number of objective lenses;
- a revolver position detecting means cooperating with said rotary revolver for detecting which of the objective lenses is currently used and a motor connected to said rotary revolver and capable of moving said rotary revolver for focusing;
- said memory means comprises a setting switch, a control circuit connected to said setting switch, a memory circuit connected to said control circuit and serving for storing said data indicative of proper focus when activated by said setting switch and said revolver position detecting means connected to said control circuit, and said correcting means comprises a motor driving circuit connected between said control circuit and said motor for controlling said motor based on an output of said control circuit.

6. A multiple lens microscope control system comprising:
- a plural number of objective lenses, switchable from one to another so that any one of said objective lenses is a currently used objective lens;
- a revolver for holding and revolving said plural number of objective lenses;
- a revolver position detecting means cooperating with said revolver for detecting which of the objective lenses is said currently used objective lens;
- a stage for holding a sample to be observed through the currently used objective lens;
- stage position detecting means, coupled to said stage, for automatically detecting a position of said stage at all times and producing an output indicative thereof;
- memory means for automatically storing data indicative of a distance for proper focus for said each lens and data indicative of said currently used objective lens as supplied by said revolver position detecting means; and
- correcting means, connected to said memory means to access said data for said currently-used objective lens, for automatically correcting focusing for the currently used objective lens based on said data from said memory means, said correcting means comprising means for moving said stage until said output from said stage position detecting means coincides with said data for said currently used objective lens.

7. A multiple lens microscope control system comprising:
- a plural number of objective lenses, switchable from one to another so that any one of said objective lenses is a currently used objective lens;
- a revolver for holding and revolving said plural number of objective lenses;
- a revolver position detecting means cooperating with said revolver for detecting which of the objective lenses is said currently used objective lens;
- a stage for holding a sample to be observed through the currently used objective lens;
- a motor for moving said stage along an optical axis between the stage and the objective lens currently being used to different positions of said stage;
- an encoder, coupled to said motor, for detecting an amount of movement of said motor to automatically detect a position of said stage and producing an output indicative thereof;
- memory means for automatically storing data indicating said position of said stage from said encoder and data indicative of said currently used objective lens as supplied by said revolver position detecting means, said data indicative of a distance for proper focus for said each lens; and
- correcting means, connected to said memory means to access said data for said currently-used objective lens for correcting focusing for the currently used objective lens based on said data from said memory means, said correcting means comprising means for driving said motor to move said stage until said output from said encoder coincides with said data for said currently used objective lens.

8. A multiple lens microscope control system comprising:
- a plural number of objective lenses, and a revolver by which said lenses are switchable from one to another so that any one of said objective lenses is a currently used objective lens;
- a stage for holding an object to be imaged by said currently used objective lens;
- memory means for storing a data table including data indicative of focus position data for each of said plural objective lenses and data indicative of a distance between said each lens and said stage for proper focus of said each lens; and
- correcting means, connected to said memory means, for adjusting a distance between said currently used objective lens relative to said stage to a distance corresponding to said data indicative of proper focus, to correct focusing for the objective lens currently used.

9. A multiple lens microscope control system comprising:
- a plural number of objective lenses, switchable from one to another so that any one of said objective lenses is a currently used objective lens;
- a stage for holding an object to be imaged by said currently used objective lens;
- memory means for storing data for each of said objective lenses indicative of a distance between said lens and said stage for proper focus;
- correcting means, connected to said memory means, for moving said currently used objective lens relative to said stage to a distance corresponding to said data indicative of proper focus, to correct focusing for the objective lens currently used based on said data stored in said memory means;
- a rotary revolver for holding and revolving said plural number of objective lenses;
- a revolver position detecting means cooperating with said rotary revolver for detecting which of the objective lenses is currently being used;
- said memory means comprising an input device capable of inputting stage position data, a control circuit connected to said input device, a memory circuit connected to said control circuit for storing said data, and said revolver position detecting means connected to said control circuit for detecting a position of said revolver relative to said stage; and
- said correcting means comprises a driving circuit connected to said control circuit and a motor connected to said motor driving circuit for moving said objective lens currently used.

10. A multiple lens microscope control system comprising:
- a plural number of objective lenses, switchable from one to another so that any one of said objective lenses is a currently used objective lens;
- a rotary revolver for holding and revolving said plural number of objective lenses to allow one of said plural objective lenses to be used for focusing;
- a revolver position detecting means cooperating with said rotary revolver for detecting which of the objective lenses is currently being used and producing an indication of the currently-used objective lens;
- a stage for holding a sample to be observed through the objective lens currently used on a surface thereof;
- a focusing section comprising means for moving one of said revolver or said stage relative to the other to change a relative position therebetween;
- memory means for storing a data table including said indication of the currently-used objective lens and position data indicative of a position of the focusing section for proper focus for each of said objective lenses,
- said memory means comprising an input device having a data input mechanism on which said position data can be entered, a control circuit connected to said input device, and a memory circuit connected to said control circuit for storing said data table; and
- correcting means, connected to said memory means to access said data for said currently-used objective lens, for correcting focusing for the objective lens currently used based on said data stored in said memory means, said correcting means comprises a driving circuit, connected to said control circuit, for driving said focusing section to move said one of said revolver and said stage by an amount corresponding to the data in said memory circuit indicative of said currently used lens.

* * * * *